United States Patent
Li (10) Patent No.: US 9,521,106 B2
(45) Date of Patent: Dec. 13, 2016

(54) METHOD, SYSTEM AND DEVICE FOR OBTAINING POTENTIAL FRIENDS INFORMATION

(71) Applicant: TENCENT TECHNOLOGY (SHENZHEN) COMPANY LIMITED, Shenzhen, Guangdong (CN)

(72) Inventor: Minge Li, Guangdong (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 224 days.

(21) Appl. No.: 14/327,408

(22) Filed: Jul. 9, 2014

(65) Prior Publication Data

US 2014/0324957 A1  Oct. 30, 2014

Related U.S. Application Data

(63) Continuation of application No. PCT/CN2013/072448, filed on Mar. 12, 2013.

(30) Foreign Application Priority Data

Mar. 12, 2012  (CN) .......................... 2012 1 0063445

(51) Int. Cl.
*G06F 15/16* (2006.01)
*H04L 12/58* (2006.01)
(Continued)

(52) U.S. Cl.
CPC ......... *H04L 51/32* (2013.01); *G06F 17/30867* (2013.01); *H04L 61/1594* (2013.01); *H04L 67/306* (2013.01)

(58) Field of Classification Search
CPC .................. H04L 12/588; H04L 51/32; H04L 61/1547–61/1564; H04L 61/1594; H04L 67/1061–67/1072
See application file for complete search history.

(56) References Cited

U.S. PATENT DOCUMENTS

| 6,571,251 | B1 | 5/2003 | Koski et al. | |
| 2009/0094048 | A1* | 4/2009 | Wallace | G06Q 50/01 705/319 |

(Continued)

FOREIGN PATENT DOCUMENTS

| CN | 101431483 | 5/2009 |
| CN | 101540739 | 9/2009 |

(Continued)

OTHER PUBLICATIONS

Office Action issued in corresponding Korean Application No. 2014-7028553, mailed on Jun. 23, 2015.

(Continued)

*Primary Examiner* — Brendan Higa
(74) *Attorney, Agent, or Firm* — Frommer Lawrence & Huag LLP; William S. Frommer (57) ABSTRACT

A method, a system and a device for obtaining potential friends information are disclosed in the present invention. The method includes: a server receives a request sent by a requesting client for obtaining potential friends information from a recommending user which is appointed by a requesting user; the server forwards the request for obtaining the potential friends information to a recommending client that pertains to the recommending user; the server receives the potential friends information sent by the recommending client, and determines whether users corresponding to the potential friends information and the recommending user are friends, and if yes, sends the potential friends information to the requesting client.

8 Claims, 5 Drawing Sheets

(51) Int. Cl.
   *H04L 29/12*     (2006.01)
   *G06F 17/30*     (2006.01)
   *H04L 29/08*     (2006.01)

(56) References Cited

U.S. PATENT DOCUMENTS

| | | | | |
|---|---|---|---|---|
| 2009/0157795 | A1* | 6/2009 | Black | G06Q 10/10 709/202 |
| 2010/0217721 | A1* | 8/2010 | Wormald | G06Q 50/01 705/319 |
| 2010/0332283 | A1* | 12/2010 | Ng | G06Q 10/0637 705/7.36 |
| 2011/0196923 | A1 | 8/2011 | Marcucci et al. | |
| 2011/0289011 | A1* | 11/2011 | Hull | G06Q 10/107 705/319 |
| 2012/0041907 | A1* | 2/2012 | Wang | G06Q 30/02 706/12 |
| 2012/0311036 | A1* | 12/2012 | Huhn | G06Q 10/10 709/204 |
| 2013/0165234 | A1* | 6/2013 | Hall | A63F 13/00 463/42 |

FOREIGN PATENT DOCUMENTS

| | | |
|---|---|---|
| CN | 101540739 A | 9/2009 |
| KR | 2008-0000878 A | 1/2008 |
| KR | 2010-0001650 A | 1/2010 |
| KR | 2011-0066663 A | 6/2011 |
| RU | 2010132209 A | 2/2012 |

OTHER PUBLICATIONS

International Search Report issued in corresponding International Application No. PCT/CN2013/072448 dated Jun. 20, 2013.
Office Action issued in corresponding Korean Application No. 2014-7028553, mailed on Dec. 15, 2015.
Office Action issued in corresponding Russian Patent Application No. 2014140443/08(065528), mailed on Jun. 1, 2016.

* cited by examiner

METHOD, SYSTEM AND DEVICE FOR OBTAINING POTENTIAL FRIENDS INFORMATION

CROSS-REFERENCE TO RELATED APPLICATIONS

This present application is a continuation application of PCT Patent Application No. PCT/CN2013/072448 filed on Mar. 12, 2013, which claims the benefit of priority to Chinese Patent Application No. 201210063445.5 field in the Chinese Patent Office on Mar. 12, 2012 and entitled "METHOD, SYSTEM AND DEVICE FOR OBTAINING POTENTIAL FRIENDS INFORMATION", the content of which is incorporated by reference herein in its entirety for all purposes.

FIELD

The present disclosure relates to Internet technology field, and specifically, to a method, a system and a device for obtaining potential friends information.

BACKGROUND

SNS (social networking services) community is a kind of Internet application servers designed to help people build social networks.

In the SNS community, different users can build friendships therebetween, in order to facilitate communication between each other. Lists of user's friends store information of the users who have established relationships with the recommending user. The recommending user often needs to obtain the potential friends information, namely, the potential friends information is the information of potential users who may establish friend relationship with the recommending user.

In general, the potential friends of the recommending user have certain common characteristics with the recommending user, such as, in the same geographical area, or same age, or the same profession, or the same hobbies, etc. Thus, an existing method for obtaining the information of the potential friends is: querying profile information of other users by the recommending user; determining whether the other users and the recommending user can become friends according to the profile information of the other users; if yes, sending a request for establishing a relationship to the other users; successfully establishing the relationship with the other users if the other users agree to the request.

However, the existing method for obtaining the information of the potential friends needs the recommending user to browse a large number of profile information of the users, resulting in lower efficiency. Moreover, since the profile information can only reflect limited user characteristics, and the user characteristics sometimes are not true, therefore, which is unable to accurately obtain the information of the potential friends.

SUMMARY

In view of this, a main purpose of present disclosure is providing a method, a system and a device for obtaining potential friends information, which can improve efficiency and accuracy for obtain the potential friends information.

The technology solution of a method for obtaining friends information of present disclosure is realized as:

receiving, by a server, a request sent by a requesting client and obtaining potential friends information from a recommending user that is appointed by a requesting user;

forwarding, by the server, the request to a recommending client that pertains to the recommending user; and receiving, by the server, the potential friends information sent by the recommending client; and determining, by the server, whether users corresponding to the potential friends information and the recommending user are friends, and if yes, sending the potential friends information to the requesting client.

A system for obtaining potential friends information, comprising: a requesting client, a server and a recommending client;

the requesting client, configured to receive a command for obtaining potential friends information of a requesting user, and send a request for obtaining the potential friends information of a recommending user that is appointed by the requesting user to the server, and receive the potential friends information sent by the server;

the server, configured to forward the request sent by the requesting client to the recommending client that pertains to the recommending user, and receive the potential friends information sent by the recommending client, and determine whether users corresponding to the potential friends information and the recommending user are friends or not, and if yes, send the potential friends information to the requesting client; and the recommending client, configured to receive the request for obtaining potential friends information transmitted by the server, and send the potential friends information to the server.

A server for obtaining potential friends information, comprising: a forwarding module and a determining module;

the forwarding module, configured to receive a request for obtaining potential friends information sent by a requesting client, and forward the request to a recommending client of a recommending user that is appointed by a requesting user, and receive the potential friends information sent by the recommending client, and send the potential friends information to the requesting client when the determining module determines that the recommending user and users corresponding to the potential friends information are friends; and the determining module, configured to determine whether the recommending user and the users corresponding to the potential friends information are friends.

A client for obtaining potential friends information, comprising: a receiving module, an obtaining module and a transmitting module;

the receiving module, configured to receive a command for obtaining potential friends information of a requesting user, and receive a command for selecting a recommending user from a friends list obtained by the obtaining module, and receive the potential friends information sent by a recommending client appointed by the requesting user through a server;

the obtaining module, configured to obtain the friends list of the requesting user from the server; and the transmitting module, configured to transmit a request for obtaining the potential friends information to the recommending client through the server.

A client for obtaining potential friends information, comprising: a receiving module, an obtaining module and a transmitting module;

the receiving module, configured to receive a request for obtaining potential friends information sent by a requesting client through a server, and receive a command for selecting a friend from a friends list of a recommending user;

the obtaining module, configured to obtain the friends list of the recommending user; and the transmitting module, configured to transmit information of the friend selected by the recommending user.

According to the above technical solutions of the present disclosure, the requesting user sends the request for obtaining potential friends information to the recommending client, the recommending client sends the potential friends information to the requesting client, so that the requesting user can obtain the potential friends information without the need for browsing a large number of profile information, therefore increasing the efficiency of obtaining potential friends information. Moreover, the server can determines whether the users corresponding to the potential friends information and the recommending user are friends, so that the friend of the recommending user can be recommended to the recommending client. Thus, one the one hand, the recommending user can fully understand the characteristics of the recommended users, so that suitable users are recommended to the requesting user, which can improve the accuracy of obtaining potential friends information of the requesting user and avoid interference of the recommending user to unfamiliar users.

DETAILED DESCRIPTION OF ILLUSTRATED EMBODIMENTS

Further description of present disclosure will be illustrated, which is combined with embodiments in drawings and detailed embodiments to make the purpose, the technical solutions and the advantages of the present invention more clearly.

Figure 1:
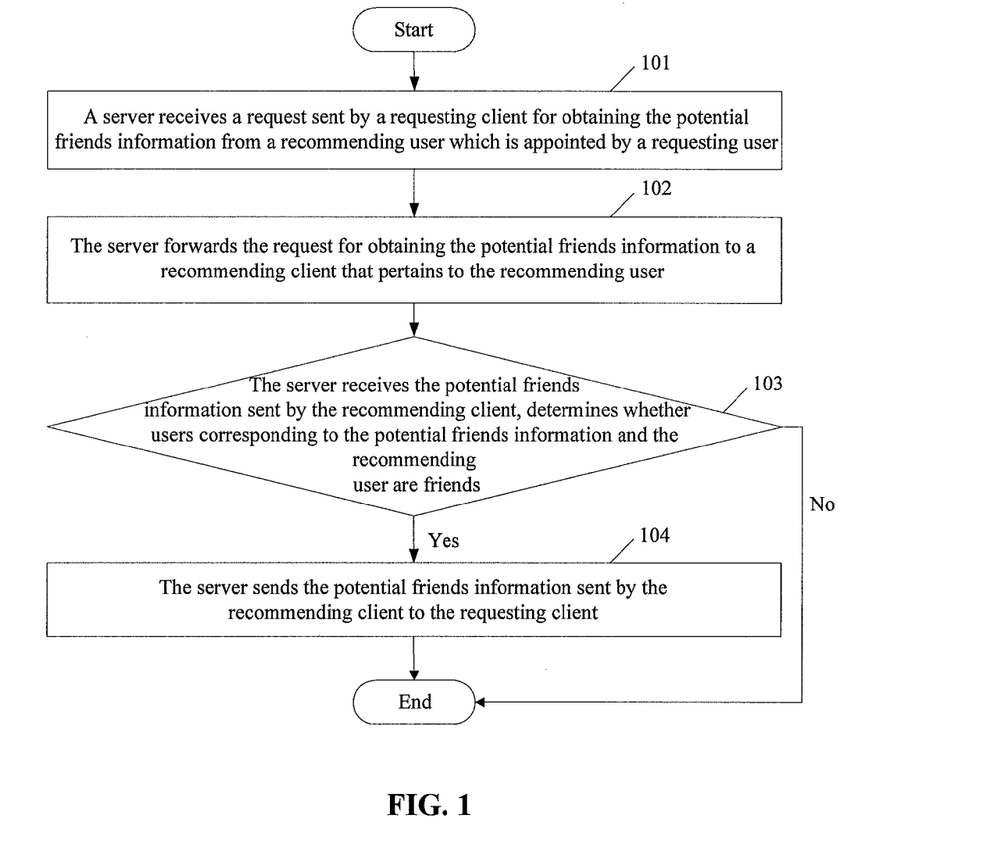
FIG. 1 is a flowchart of a method for obtaining potential friends information provided in one embodiment of the present invention.

Referring to FIG. 1, FIG. 1 is a flowchart of a method for obtaining potential friends information provided in one embodiment of the present invention.

As shown in FIG. 1, the method may include steps as below:

In step 101, receiving, by a server, a request sent by a requesting client and obtaining potential friends information from a recommending user that is appointed by a requesting user.

In step 102, forwarding, by the server, the request for obtaining potential friends information to a recommending client that pertains to the recommending user.

In step 103, receiving, by the server, the potential friends information sent by the recommending client and determining whether users corresponding to the potential friends information and the recommending user are friends, and if yes, performing step 104, otherwise, ending the processing.

In step 104, sending, by the server, the potential friends information sent by the recommending client to the requesting client.

Wherein, before the step 101, the requesting user can send a command to the requesting client for finding out the potential friends information by clicking a button of "finding out potential friends". In this embodiment, the requesting client is a client and is configured to receive a commend for obtaining potential friends information of the requesting user, and send a request for obtaining the potential friends information of the recommending user which is appointed by the requesting user to the server, and receive the potential friends information. The recommending client is configured to receive the request for obtaining potential friends information sent by the server, and send the potential friends information to the server.

In the embodiment of the present invention, the recommending users which is appointed by the requesting user can be a friend in a friends list of the requesting user. In this case, when the requesting client receives the command for finding out the potential friends information sent by the requesting user, then the requesting client obtains the friends list of the requesting user from the server or local, and receives a command for selecting the friend from the friends list sent by the requesting user, and considers the friend selected by the requesting user as the recommending user which is appointed by the requesting user, and sends the request to the server for obtaining the potential friends information from the recommending client.

It should be understood that the requesting user can only select one friend as the recommending user each time, or can select multiple friends as the recommending user each time.

In the embodiment of the present invention, after the step 102 of forwarding, by the server, the request for obtaining potential friends information to a recommending client that pertains to the recommending user, the method further includes the following steps: obtaining a friends list of the recommending user; receiving the command for selecting a friend to be recommended from the friends list of the recommending user; and sending information of the friend selected by the recommending user to the server as the potential friends information.

Figure 2:
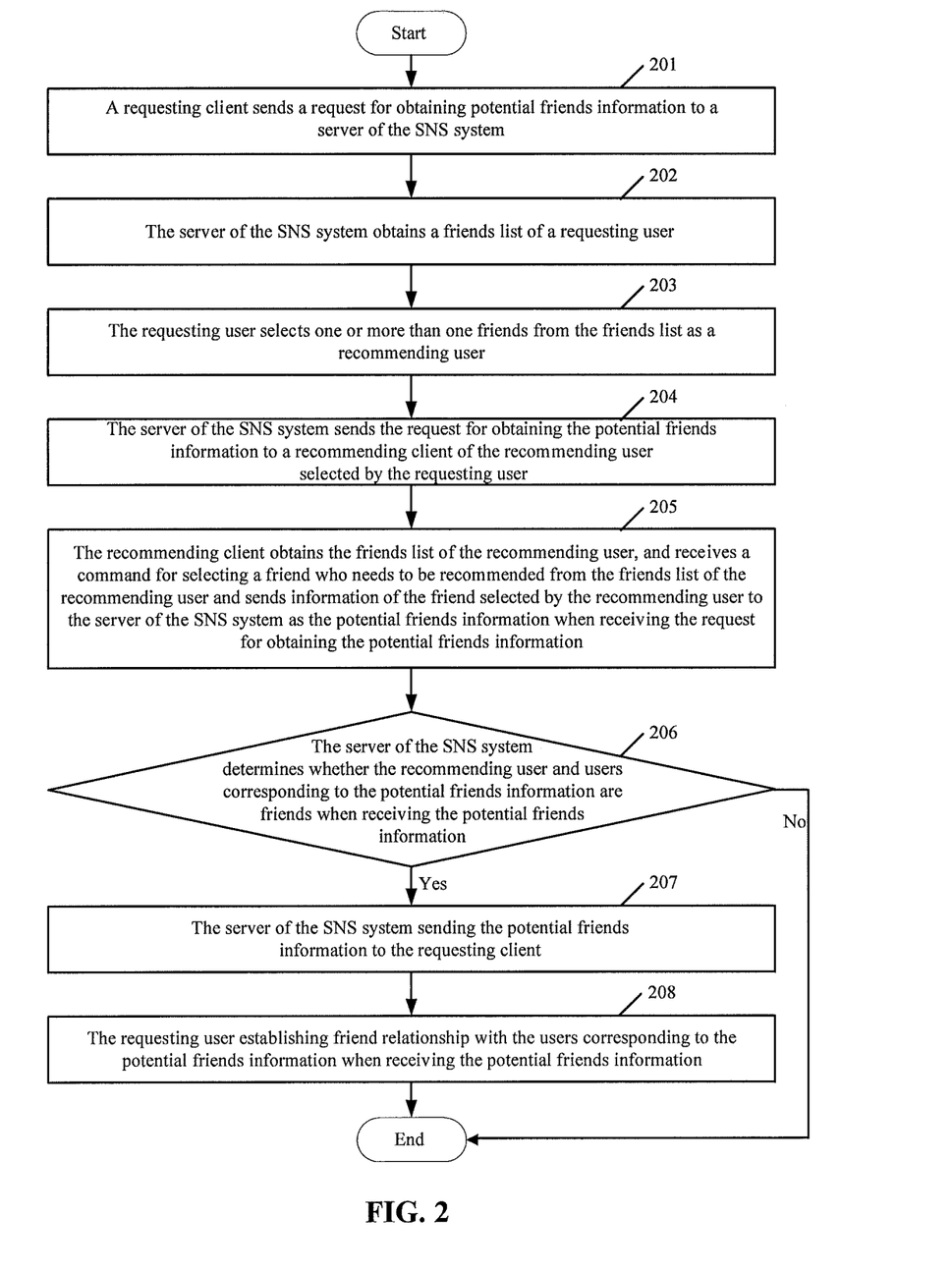
FIG. 2 is a flowchart of a method for obtaining potential friends information provided in another embodiment of the present invention.

Referring to FIG. 2, a specific example is provided as below to illustrate the method for obtaining potential friends information in detail.

FIG. 2 is a flowchart of a method for obtaining potential friends information provided in another embodiment of the present invention.

In the embodiment of the present invention, the SNS (social networking services) system is taken here as an example. Referring to FIG. 2, the method for obtaining potential friends information may include steps as below:

In step 201, a requesting client of a requesting user sending a request for obtaining potential friends information to a server of the SNS system, for example, by means of clicking a button for obtaining potential friends in the SNS system.

In step 202, the server of the SNS system obtaining a friends list of the requesting user.

In step 203, the requesting user selecting one or more than one friends from the friends list as a recommending user.

In step 204, the server of the SNS system sending the request for obtaining the potential friends information to the recommending client selected by the requesting user.

In step 205, the recommending client obtaining the friends list of the recommending user, and receiving a command for selecting friends who need to be recommended from the friends list of the recommending user and sending the information of the friend selected by the recommending user to the server of the SNS system as the potential friends information when receiving the request for obtaining the potential friends information.

In step 206, the server of the SNS system determining whether the recommending user and the users corresponding to the potential friends information are friends when receiving the potential friends information, and if yes, performing step 107, otherwise, ending the process.

In step 207, the server of the SNS system sending the potential friends information to the requesting client.

In step 208, the requesting user establishing friend relationship with the users corresponding to the potential friends information when receiving the potential friends information.

Referring to FIGS. 3-6, the present disclosure also discloses a system and a device in accordance with the method for obtaining potential friends information.

Figure 3:
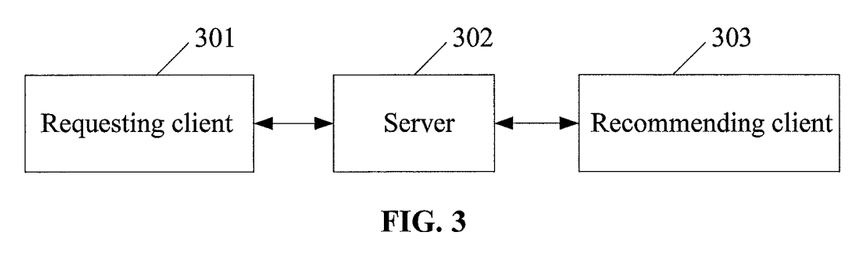
FIG. 3 is a schematic diagram of a system of obtaining potential friends information provided in one embodiment of the present invention.

FIG. 3 is a schematic diagram of a system of obtaining potential friends information provided in one embodiment of the present invention. As shown in FIG. 3, the system may include: a requesting client 301, a server 302 and a recommending client 303.

The requesting client 301, is configured to receive a command for obtaining potential friends information of a requesting user, and send a request for obtaining the potential friends information of a recommending user that is appointed by the requesting user to the server 302, and receive the potential friends information sent by the server 302.

The server 302, is configured to forward the request sent by the requesting client 301 to the recommending client 303 that pertains to the recommending user, and receive the potential friends information sent by the recommending client 303, and determine whether users corresponding to the potential friends information and the recommending user are friends or not, and if yes, send the potential friends information to the requesting client 301.

The recommending client, is configured to receive the request for obtaining potential friends information transmitted by the server 302, and send the potential friends information to the server 302.

In the embodiment of the present invention, the recommending user appointed by the requesting user can be a friend in the friends list of the requesting user. The requesting client 301 is further configured to obtain the friends list of the requesting user, and receive a command for selecting the friend from the friends list, and choose the friend selected by the requesting user as the recommending user appointed by the requesting user.

The recommending client 303, is further configured to receive a command for selecting a friend from the friends list of the recommending user, and choose information corresponding to the friend selected from the friends list as the potential friends information.

Figure 4:
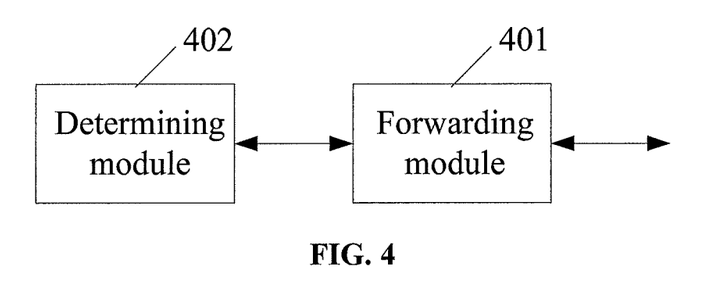
FIG. 4 is a schematic diagram of a server for obtaining potential friends information provided in one embodiment of the present invention.

FIG. 4 is a schematic diagram of a server for obtain potential friends information provided in one embodiment of the present invention.

As shown in FIG. 4, the server may include: a forwarding module 401 and a determining module 402.

The forwarding module 401, is configured to receive a request for obtaining potential friends information sent by a requesting client, and forward the request for obtaining potential friends information to a recommending client that is appointed by a requesting user, and receive the potential friends information sent by the recommending client, and send the potential friends information to the requesting client when the determining module 402 determines that the recommending user and users corresponding to the potential friends information are friends.

The determining module 401, is configured to determine whether the recommending user and the users corresponding to the potential friends information are friends.

Figure 5:
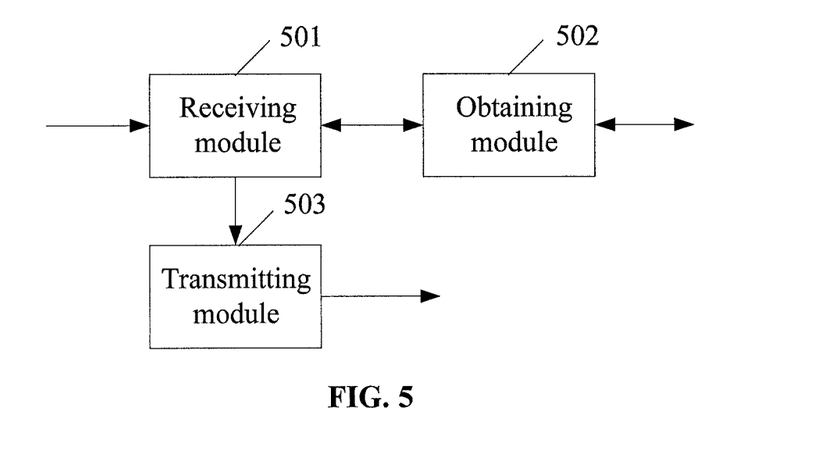
FIG. 5 is a schematic diagram of a requesting client for obtaining potential friends information provided in one embodiment of the present invention.

FIG. 5 is a schematic diagram of a requesting client for obtaining potential friends information provided in one embodiment of the present invention.

Referring to FIG. 5, the requesting client may include: a receiving module 501, an obtaining module 502 and a transmitting module 503.

The receiving module 501, is configured to receive a command for obtaining potential friends information of a requesting user, and receive a command for selecting a friend from a friends list obtained by the obtaining module 502, and choose the friend selected by the requesting user as the recommending user appointed by the requesting user, and receive the potential friends information sent by a recommending client appointed by the requesting user through a server.

The obtaining module 502, is configure to obtain the friends list of the requesting user from the server.

The transmitting module 503, is configured to transmit a request for obtaining the potential friends information to the recommending client through the server.

Figure 6:
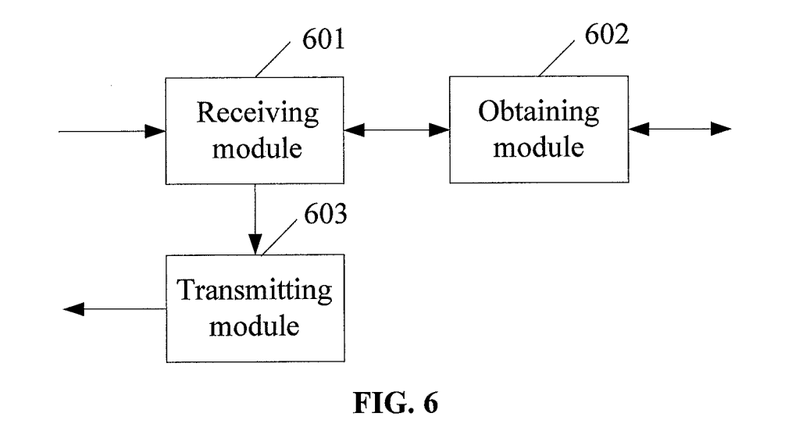
FIG. 6 is a schematic diagram of a recommending client for obtaining potential friends information provided in one embodiment of the present invention.

FIG. 6 is a schematic diagram of a recommending client for obtaining potential friends information provided in one embodiment of the present invention.

As shown in FIG. 6, the recommending client may include: a receiving module 601, an obtaining module 602 and a transmitting module 603.

The receiving module 601, is configured to receive a request for obtaining potential friends information sent by a requesting client through a server, and receive a command for selecting a friend from a friends list of a recommending user.

The obtaining module 602, is configured to obtain the friends list of the recommending user.

The transmitting module 603, is configured to transmit information of the friend selected by the recommending user.

The above embodiments of the present invention can be realized by hardware, software or a combination of hardware and software. For example, various methods, steps and function modules described in the embodiments of the present invention can be implemented by a processor (the processor here refers to a processor in a broad sense, includes a CPU, a processing unit, an ASIC, a logical unit or a programmable logic array, etc.). Processes, methods and function modules described in the embodiments of the present invention may be realized by a single processor or a plurality of processors. The processor in any embodiment or any claim should be understood as one or more than one processor. The processes, the methods and the function modules described in the embodiments of the present invention may also be realized by one or more than one processor, hardware logic circuits of one processor or more than one processor, or machine readable instructions executed by a combination of the processor and the hardware logic circuits. Furthermore, the embodiments described in the present invention can be realized by software products. The software products are stored in non-volatile storage medium and include a series of instructions to enable computer devices (such as personal computers, servers or network equipments such as routers, switches, access points, etc.) to implement the methods described in the embodiments of present invention.

While the present disclosure has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present disclosure. Accordingly, the scope of the present invention is described by the appended claims and is supported by the foregoing description.

What is claimed is:

1. A method for obtaining potential friends information, comprising:
   receiving, by a server, a request sent by a requesting client and obtaining potential friends information from a recommending user that is appointed by a requesting user of the requesting client;
   forwarding, by the server, the request to a recommending client that pertains to the recommending user; and
   receiving, by the server, the potential friends information sent by the recommending client; and
   determining, by the server, whether users corresponding to the potential friends information and the recommending user are friends, and if yes, sending the potential friends information to the requesting client.

2. The method according to claim 1, wherein the recommending user is a friend in a friends list of the requesting user; before the step of receiving, by a server, a request sent by a requesting client and obtaining potential friends information from a recommending user that is appointed by a requesting user of the requesting client, the method further comprises:
   obtaining, by the requesting client, the friends list of the requesting user, and receiving a command for selecting a friend from the friends list, and considering the friend selected by the requesting user as the recommending user, and sending a request for obtaining the potential friends information of the recommending client to the server.

3. The method according to claim 2, wherein the number of the friends selected by the requesting user is one or more than one.

4. The method according to claim 1, after the step of forwarding, by the server, the request to a recommending client that pertains to the recommending user, further comprising:
   obtaining, by the recommending client, a friends list of the recommending user, and receiving a command for selecting a friend who needs to be recommended from the friends list of the recommending user, and sending information of the friend selected by the recommending user to the server as the potential friends information.

5. A system for obtaining potential friends information, comprising:
   a requesting client, a server and a recommending client;
   the requesting client, configured to receive a command for obtaining potential friends information of a requesting user, and send a request for obtaining the potential friends information of a recommending user that is appointed by the requesting user to the server, and receive the potential friends information sent by the server;
   the server, configured to forward the request sent by the requesting client to the recommending client that pertains to the recommending user, and receive the potential friends information sent by the recommending client, and determine whether users corresponding to the potential friends information and the recommending user are friends or not, and if yes, send the potential friends information to the requesting client; and
   the recommending client, configured to receive the request for obtaining potential friends information transmitted by the server, and send the potential friends information to the server.

6. The system according to claim 5, wherein,
the recommending user is a friend in a friends list of the requesting user;
the requesting client is further configured to obtain the friends list of the requesting user, and receive a command for selecting a friend from the friends list, and consider the friend selected by the requesting user as the recommending user, and send a request for obtaining the potential friends information of the recommending client to the server.

7. The system according to claim 5, wherein
the recommending client is further configured to receive a command for selecting a friend from a friends list of the recommending user, and choose information corresponding to the friend selected from the friends list as the potential friends information, and send the information of the friend to the server.

8. A server for obtaining potential friends information, comprising:
   a memory storing a series of instructions; and
   a processor configured to perform the series of instructions for:
   receiving a request for obtaining potential friends information sent by a requesting client, and forwarding the request to a recommending client of a recommending user that is appointed by a requesting user, and receiving the potential friends information sent by the recommending client, and sending the potential friends information to the requesting client determining that the recommending user and users corresponding to the potential friends information are friends; and
   determining whether the recommending user and the users corresponding to the potential friends information are friends.

* * * * *